US009780960B2

(12) United States Patent
Bidaralli et al.

(10) Patent No.: US 9,780,960 B2
(45) Date of Patent: Oct. 3, 2017

(54) EVENT NOTIFICATIONS IN A SHARED INFRASTRUCTURE ENVIRONMENT

(71) Applicant: Dell Products, L.P., Round Rock, TX (US)

(72) Inventors: Santosh Kumar Bidaralli, Round Rock, TX (US); Yogesh Prabhakar Kulkarni, Round Rock, TX (US); Lokesh Krishna Bangera, Round Rock, TX (US); Chandrasekhar Mugunda, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 86 days.

(21) Appl. No.: 14/497,303

(22) Filed: Sep. 25, 2014

(65) Prior Publication Data
US 2016/0094359 A1    Mar. 31, 2016

(51) Int. Cl.
*G06F 15/16* (2006.01)
*H04L 12/18* (2006.01)
*H04L 12/24* (2006.01)

(52) U.S. Cl.
CPC ...... *H04L 12/1895* (2013.01); *H04L 41/0686* (2013.01)

(58) Field of Classification Search
CPC ............ H04L 12/1895; H04L 41/0686; G06F 11/3466; G06F 17/2705; G06F 17/2765; G06F 17/30613; G06F 17/3089; G06F 17/30943; G06F 2201/865; G06F 8/65; G06F 9/00; G06F 9/4445; G06F 9/46; G06F 9/466; G06F 9/4843; G06F 9/5044; G06F 9/505; G06F 9/5077
USPC .................................................. 709/224–245
See application file for complete search history.

(56) References Cited

U.S. PATENT DOCUMENTS

| | | | |
|---|---|---|---|
| 2004/0125798 A1* | 7/2004 | Hondo | H04L 29/06 370/389 |
| 2005/0044202 A1* | 2/2005 | Shirota | G06F 1/3209 709/223 |
| 2005/0149259 A1* | 7/2005 | Cherveny | G01C 21/26 701/532 |
| 2010/0134281 A1* | 6/2010 | Duffy | G06F 8/71 340/540 |
| 2011/0040917 A1* | 2/2011 | Lambert | H04L 69/18 710/301 |
| 2011/0047538 A1* | 2/2011 | Chung | H04L 41/082 717/173 |

* cited by examiner

*Primary Examiner* — David Lazaro
*Assistant Examiner* — Berhanu Shitayewoldetsad
(74) *Attorney, Agent, or Firm* — Norton Rose Fulbright US LLP (57) ABSTRACT

A shared infrastructure environment system is provided that includes a capability to notify individual nodes of notifications, events, and alerts. The system receives, via a management fabric, a subscription from an event client module for information associated with a component. The system also receives a component update associated with the component. The system identifies if any event client module operating on any node has subscribed to receive component updates associated with the component, and sends the component update, via the management fabric, to the identified event client modules.

14 Claims, 5 Drawing Sheets

EVENT NOTIFICATIONS IN A SHARED INFRASTRUCTURE ENVIRONMENT

TECHNICAL FIELD

The embodiments of the disclosure relate generally to the field of information handling systems, and more specifically, to event notifications in a shared infrastructure environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system (or a single hypervisor running multiple virtualized operating systems) and input/output ("I/O") resources at a time, or a bulky server chassis providing multiple servers and I/O control modules in a single chassis. A system chassis with multiple information handling systems with various peripheral and I/O capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and I/O capabilities common to the chassis as a whole presents numerous challenges.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for event notifications in a shared infrastructure environment. The method may include receiving, via a management fabric and at an event server module executing on the computing device, a subscription from an event client module that corresponds with a node in the shared infrastructure environment. The subscription, in one embodiment, is a subscription to receive event notification associated with a component. The method also includes receiving a component update from the event client module of any node in the shared infrastructure environment. The component update may be associated with the component.

In another embodiment, the method includes identifying event client modules of any node that have subscribed to receive component updates associated with the component, and sending the component update, via the management fabric, to the identified event client modules. The method may also include receiving node information from each event client module in the shared infrastructure environment. The node information, in one example, includes a firmware version for each component attached to a corresponding node.

In one embodiment, the method includes maintaining a list of subscriptions from the nodes. The method, in another embodiment, includes updating a central data manager with component updates, and monitoring components for a change in operating mode, including, but not limited to, firmware updates, power status updates, or service degradation updates. In one embodiment, the event server module is an asynchronous messaging server configured for many-to-many connections with the event client modules.

Another aspect of the present disclosure provides for a computer storage device having computer-executable instructions for performing a method for sharing event notifications in a shared infrastructure environment. The method may include receiving, via a management fabric and at an event server module executing on the computing device, a subscription from an event client module that corresponds with a node in the shared infrastructure environment. The subscription, in one embodiment, is a subscription to receive event notification associated with a component. The method also includes receiving a component update from the event client module of any node in the shared infrastructure environment. The component update may be associated with the component. The method includes identifying event client modules of any node that have subscribed to receive component updates associated with the component, and sending the component update, via the management fabric, to the identified event client modules.

Yet another aspect of the present disclosure provides for a system which includes a computing device having a processor and a memory. The system may be configured for performing a method that includes receiving, via a management fabric and at an event server module executing on the computing device, a subscription from an event client module that corresponds with a node in the shared infrastructure environment. The subscription, in one embodiment, is a subscription to receive event notification associated with a component. The method also includes receiving a component update from the event client module of any node in the shared infrastructure environment. The component update may be associated with the component. The method includes identifying event client modules of any node that have subscribed to receive component updates associated with the component, and sending the component update, via the management fabric, to the identified event client modules.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a", "and", and "the" may include plural referents unless the context clearly dictates otherwise. Thus, for example, reference to "a chassis management controller" refers to one or several chassis management controllers, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

For the purposes of this disclosure, information handling resources may broadly refer to any component system, device or apparatus of an information handling system, including without limitation processors, busses, memories, I/O devices and/or interfaces, storage resources, network interfaces, motherboards, electro-mechanical devices (e.g., fans), displays, and power supplies.

Figure 1:
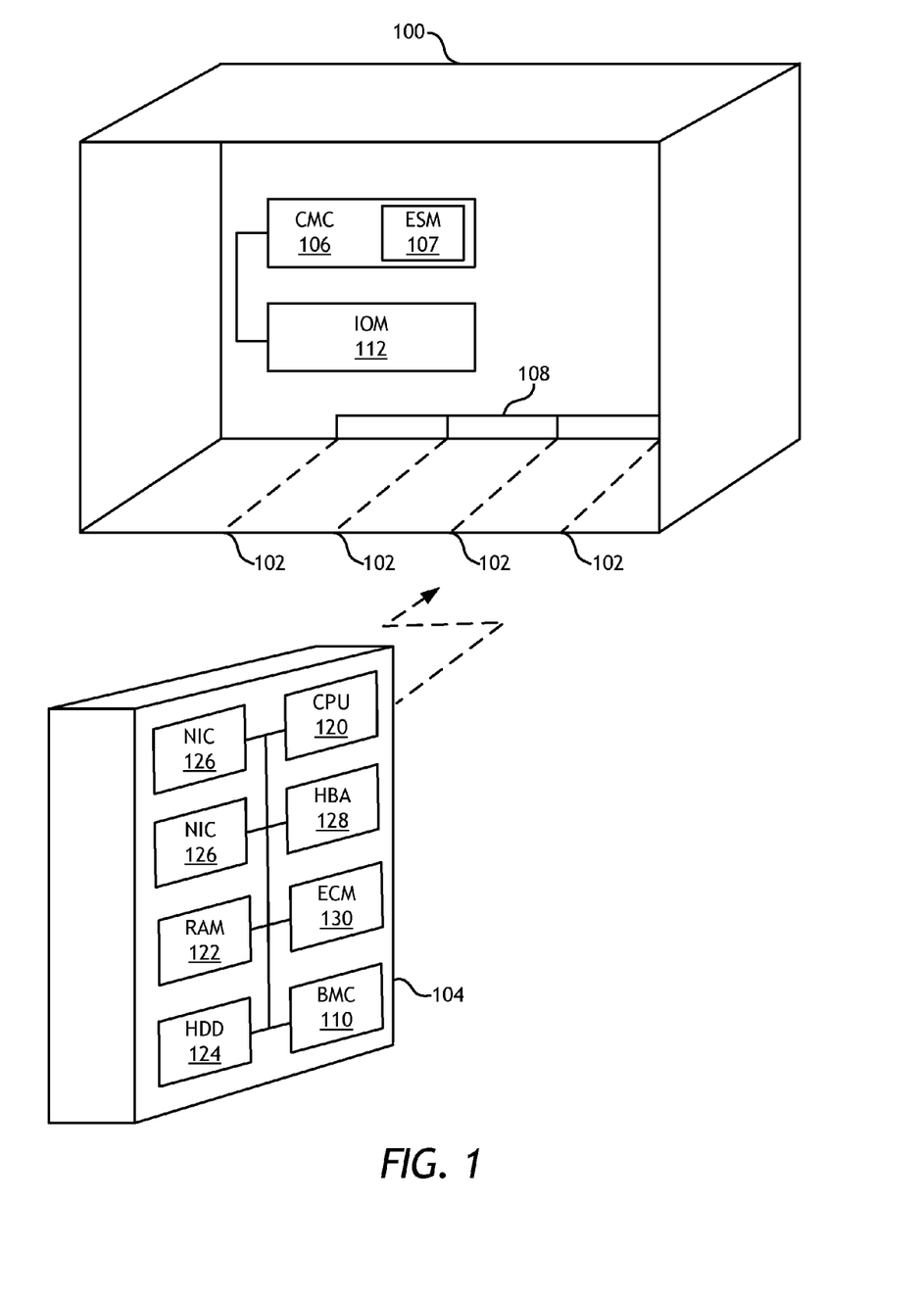
FIG. 1 is a schematic block diagram illustrating one embodiment of an information handling system ("IHS") in accordance with embodiments of the disclosure.

FIG. 1 is a schematic block diagram illustrating one embodiment of an information handling system ("IHS") in accordance with embodiments of the disclosure. In particular, FIG. 1 depicts a multi-server or blade server chassis 100 configured to communicate event notifications in a shared infrastructure environment. The blade server chassis 100 has multiple slots 102, each of which accept a blade information handling system ("node") 104.

The blade server chassis 100 has a chassis management controller 106 that manages the operation of the blade information handling systems 104 in slots 102 through a management bus 108. In one embodiment, the chassis management controller 106 includes an event server module ("ESM") 107. A node controller 110, such as a baseboard management controller (BMC) or integrated management controller (IMC), in each node 104 communicates with the chassis management controller 106 to manage operations such including, but not limited to, communicating event notifications, powering up and powering down the node 104, etc. An input/output module ("IOM") 112 located on the chassis 100 is configured to manage communications across the bus 108.

Although only one node 104 is depicted, the chassis 100 is capable of receiving more than one node 104. Each node 104 is configured with processing components that cooperate to process information. These components may include a central processing unit ("CPU") 120, random access memory ("RAM") 122, a hard disk drive ("HDD") 124, network interface cards ("NIC") 126, host bus adapters ("HBA") 128, and an event client module ("ECM") 130. The NICs 126 coordinate the communication of information with a network such as a local area network or a storage area network. The management bus 108 supports communication of management information between the chassis management controller 106 and the node 104 even when the processing components of the node 104 are in a powered down state. Accordingly, the chassis management controller 106 may support remote power-up, power-down, event notifications, and maintenance of the node 104.

Figure 2:
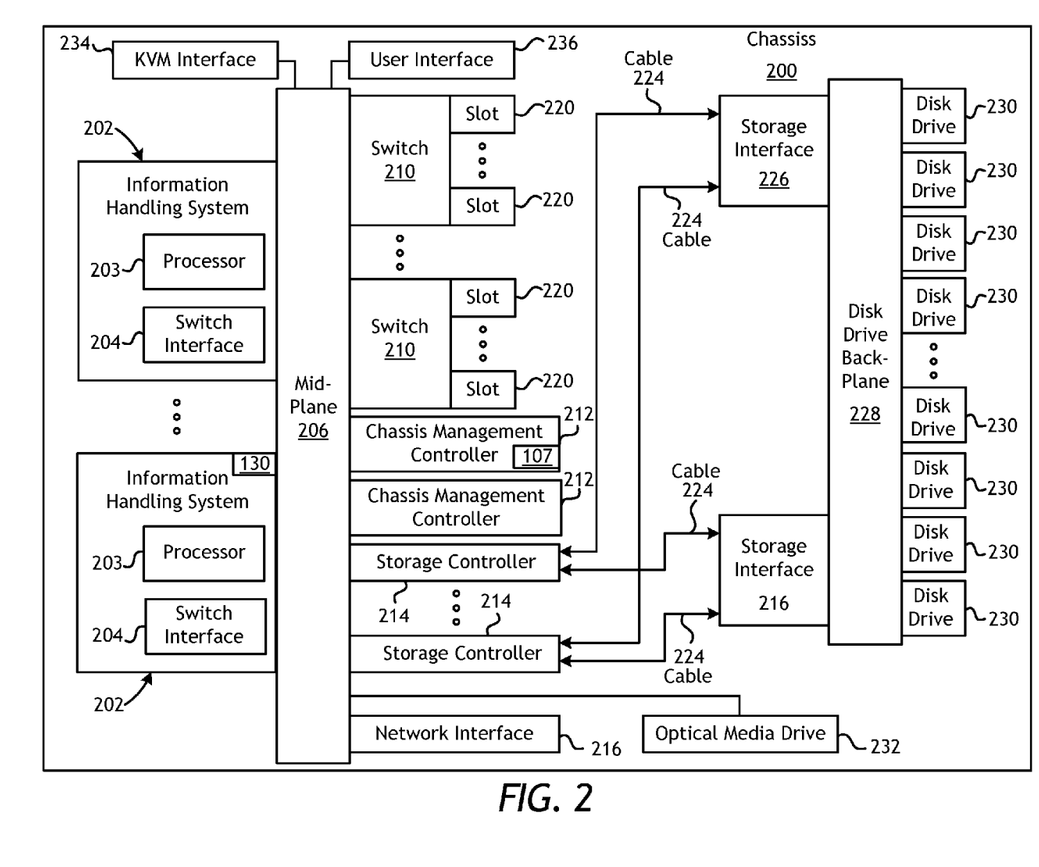
FIG. 2 is a schematic block diagram illustrating another embodiment of a system having a chassis with multiple nodes in accordance with embodiments of the disclosure.

FIG. 2 is a schematic block diagram illustrating another embodiment of a system having a chassis 200 with multiple nodes 202 in accordance with embodiments of the disclosure. As depicted in FIG. 2, the system may comprise the chassis 200 and a plurality of nodes 202, a mid-plane 206, one or more switches 210, one or more chassis management controllers 212, a network interface 216, one or more slots 220, one or more cables 224, one or more storage interfaces 226, a disk drive backplane 228, a plurality of disk drives 230, an optical media drive 232, a keyboard-video mouse ("KVM") interface 234, and a user interface 236.

The node 202 may generally be operable to receive data from and/or communicate data to one or more disk drives 230 and/or other information handling resources of the chassis 200 via the mid-plane 206 and/or switches 210. In certain embodiments, the node 202 may be a server. In such embodiments, an information handling system may comprise a blade server having modular physical design. In these and other embodiments, the node 202 may comprise an M class server. As depicted in FIG. 2, the node 202 may include a processor 203 and one or more switch interfaces 204 communicatively coupled to processor 203.

The processor 203 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, the processor 203 may interpret and/or execute program instructions and/or process data stored in a memory, a hard drive 230, and/or another component of the system.

The switch interface 204 may comprise any system, device, or apparatus configured to provide an interface between its associated node 202 and the switches 210. In some embodiments, the switches 210 may comprise Peripheral Component Interconnect Express ("PCIe") switches, in which case a switch interface 204 may comprise a switch card configured to create a PCIe-compliant interface between its associated node 202 and the switches 210. In other embodiments, the switch interface 204 may comprise an interposer. Use of the switch interfaces 204 in the nodes 202 may allow for minimal changes to be made to traditional servers while supporting the overall system architecture disclosed herein. Although FIG. 1 depicts an implementation including a single switch interface 204 per node 202, in some embodiments each node 202 may include a plurality of switch interfaces 202 for redundancy, high availability, and/or other reasons.

The mid-plane 206 may comprise any system, device, or apparatus configured to interconnect the nodes 202 with information handling resources. Accordingly, the mid-plane 206 may include slots and/or connectors configured to receive the nodes 202, the switches 210, the chassis management controllers 212, the storage controllers 114, the network interface 216, the optical media drive 232, the KVM interface 234, the user interface 236, and/or other information handling resources.

In one embodiment, the mid-plane 206 may include a single board configured to interconnect the nodes 202 with the shared information handling resources. In another embodiment, the mid-plane 206 may include multiple boards configured to interconnect the nodes 202 with the information handling resources.

The switch 210 may comprise any system, device, or apparatus configured to couple the nodes 202 to the storage controllers 214 (e.g., via the mid-plane 206) and the slots 220 and perform switching between the nodes 202 and various the information handling resources of system, including the storage controllers 214 and the slots 220. In certain embodiments, the switch 210 may comprise a PCIe switch. In other embodiments, the switch may comprise a generalized PC bus switch, an Infiniband switch, or other suitable switch. As shown in FIG. 2, the chassis 200 may include a plurality of switches 210. In such embodiments, the switches 210 may operate in a redundant mode for shared devices (e.g., the storage controllers 214 and/or devices coupled to slots 220) and in non-redundant mode for non-shared/zoned devices. As used herein, shared devices may refer to those which may be visible to more than one node 202, while non-shared devices may refer to those which are visible to only a single node 202. In some embodiments, the mid-plane 206 may include a single switch 210.

The chassis management controller 212 may be any system, device, or apparatus configured to facilitate management and/or control of system, its nodes 202, and/or one or more of its component information handling resources. The chassis management controller 212 may be configured to issue commands and/or other signals to manage and/or control the node 202 and/or information handling resources of system. The chassis management controller 212 may comprise a microprocessor, microcontroller, DSP, ASIC, field programmable gate array ("FPGA"), EEPROM, or any combination thereof. As shown in FIG. 2, the chassis management controller 212 may be coupled to the mid-plane 206. Also as shown in FIG. 2, the system may include a plurality of chassis management controllers 212, and in such embodiments, the chassis management controllers 212 may be configured as redundant. In some embodiments, the chassis management controller 212 may provide a user interface and high level controls for management of switches 210, including configuring assignments of individual nodes 202 to non-shared information handling resources of the system. In these and other embodiments, the chassis management controller may define configurations of the storage subsystem (e.g., storage controllers 214, storage interfaces 226, disk drives 230, etc.) of the system. For example, a chassis management controller may provide physical function configuration and status information that would normally occur at the driver level in traditional server implementations. Examples of physical functions include disk drive discovery and status, RAID configuration and logical volume mapping.

In addition or alternatively, the chassis management controller 212 may also provide a management console for user/administrator access to these functions. For example, the chassis management controller 212 may implement Web Services Management ("WS-MAN") or another suitable management protocol permitting a user to remotely access the chassis management controller 212 to configure system and its various information handling resources. In such embodiments, the chassis management controller 212 may interface with a network interface separate from network interface 216, thus allowing for "out-of-band" control of the system, such that communications to and from the chassis management controller 212 are communicated via a management channel (i.e., management fabric) physically isolated from an "in band" communication channel with the network interface 216.

The storage controller 214 may include any system, apparatus, or device operable to manage the communication of data between one or more of the nodes 202 and one or more of the disk drives 230. In certain embodiments, the storage controller 214 may provide functionality including, without limitation, disk aggregation and redundancy (e.g., RAID), I/O routing, and error detection and recovery. As shown in FIG. 1, the storage controller 214 may be coupled to a connector on a switch 110. Also as shown in FIG. 1, system 100 may include a plurality of the storage controllers 214, and in such embodiments, the storage controllers 214 may be configured as redundant. In addition or in the alternative, the storage controllers 214 may in some embodiments be shared among two or more nodes 202. As also shown in FIG. 1, each storage controller 214 may be coupled to one or more storage interfaces 226 via cables 224.

As depicted in FIG. 2, the switch 210 may have coupled thereto one or more slots 220. A slot 220 may include any system, device, or apparatus configured to allow addition of one or more expansion cards to the chassis 200 in order to electrically couple such expansion cards to a switch 210. Slots 220 may also include electrically conductive elements (e.g., edge connectors, traces, etc.) allowing for expansion cards inserted into slots 220 to be electrically coupled to the switches 210. In operation, switches 210 may manage switching of communications between the individual nodes 202 and the expansion cards coupled to slots 220.

The network interface 216 may include any suitable system, apparatus, or device operable to serve as an interface between the chassis 200 and an external network (e.g., a local area network or other network). The network interface 216 may enable the nodes 202 to communicate with the external network using any suitable transmission protocol (e.g., TCP/IP) and/or standard (e.g., EEE 802.11, Wi-Fi). In certain embodiments, the network interface 216 may include a network interface card ("NIC"). In the same or alternative embodiments, the network interface 216 may be configured to communicate via wireless transmissions. In the same or alternative embodiments, the network interface 216 may provide physical access to a networking medium and/or provide a low-level addressing system (e.g., through the use of Media Access Control addresses). In some embodiments, the network interface 216 may be implemented as a local area network ("LAN") on motherboard ("LOM") interface.

The storage interfaces 226 may include any system, device, or apparatus configured to facilitate communication between the storage controllers 214 and disk drives 230. For example, a storage interface may serve to permit a relatively small number of communication links (e.g., two) between storage controllers and storage interfaces 226 to communicate with a greater number (e.g., 25) of disk drives 230. Thus, a storage interface 226 may provide a switching mechanism and/or disk drive addressing mechanism that allows the node 202 to communicate with numerous disk drives 230 via a limited number of communication links and/or channels. Accordingly, the storage interface 226 may operate like an Ethernet hub or network switch that allows multiple systems to be coupled using a single switch port (or relatively few switch ports). The storage interface 226 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system may implement a plurality of redundant storage interfaces 226, as shown in FIG. 2.

Disk drive backplane 228 may comprise any system, device, or apparatus configured to interconnect modular storage interfaces 226 with the disk drives 230. Accordingly, the disk drive backplane 228 may include slots and/or connectors configured to receive the storage interfaces 226 and/or disk drives 230.

Each disk drive 230 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although the disk drives 230 are depicted as being internal to the chassis 200 in FIG. 2, in some embodiments, one or more disk drives may be located external to the chassis 200 (e.g., in one or more enclosures external to the chassis 200).

The optical media drive 232 may be coupled to the mid-plane 206 and may include any suitable system, apparatus, or device configured to read data from and/or write data to an optical storage medium (e.g., a compact disc, digital versatile disc, blue laser medium, and/or other optical medium). In certain embodiments, the optical media drive 232 may use laser light or other electromagnetic energy to read and/or write data to an optical storage medium. In some embodiments, optical media drive 232 may be non-shared and may be user-configurable such that optical media drive 232 is associated with a single node 202.

The KVM interface 234 may be coupled to the mid-plane 206 and may include any suitable system, apparatus, or device configured to couple to one or more of a keyboard, video display, and mouse and act as a switch between the nodes 202 and the keyboard, video display, and/or mouse, thus allowing a user to interface with a plurality of nodes 202 via a single keyboard, video display, and/or mouse.

User interface 236 may include any system, apparatus, or device via which a user may interact with system and its various information handling resources by facilitating input from a user allowing the user to manipulate the system and output to a user allowing system to indicate effects of the user's manipulation. For example, the user interface 236 may include a display suitable for creating graphic images and/or alphanumeric characters recognizable to a user, and may include, for example, a liquid crystal display. In certain embodiments, such a display may be an integral part of the chassis 200 and receive power from power supplies (not explicitly shown) of the chassis 200, rather than being coupled to the chassis 200 via a cable. The user interface 236 may be coupled to the chassis management controllers 212 and/or other components of the system, and thus may allow a user to configure various information handling resources of the system (e.g., assign individual nodes 202 to particular information handling resources).

When a system (e.g., system) is architected so as to allow nodes (e.g., PCIe adapters coupled to slots 220) to be located in a chassis having shared resources such that the information handling resources may be assigned to one node or shared among a plurality of nodes, challenges may arise when needing to service or perform maintenance on an information handling resource, or be notified of events relating to one of the information handling resources.

Shared resources or devices, such as PCIe adapters coupled to slots 220, may be virtualized across multiple nodes 202. Non-shared resources or devices may be partitioned such that they are visible only to a single node 202 at a time. The chassis management controller 212 may be configured to handle routing and switching through the switches 210 to affect sharing or a resource to multiple nodes 202 or to affect dedicated assignment of a resource to a single node 202.

Figure 3:
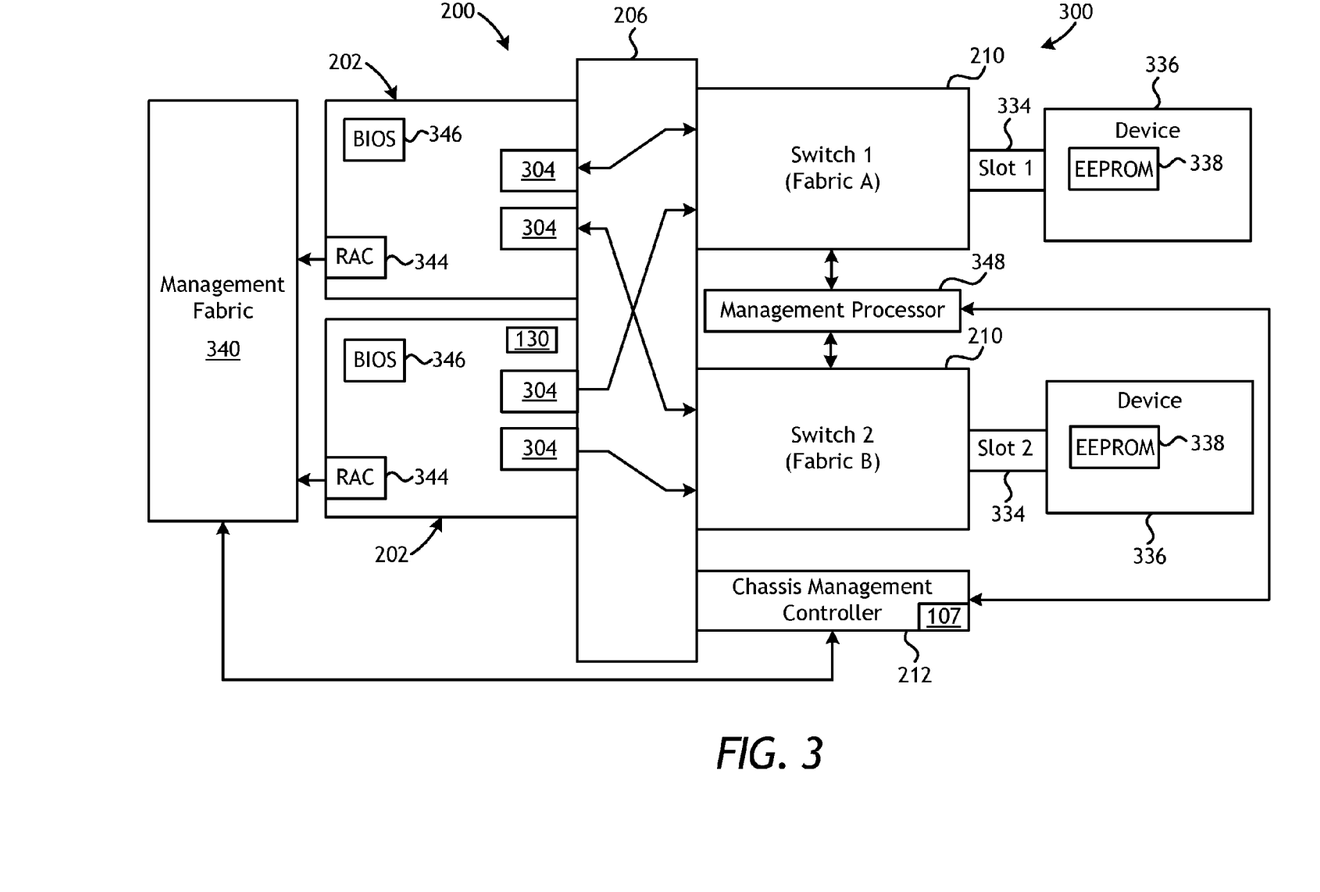
FIG. 3 illustrates a more detailed block diagram of an example system configured for switches and devices in an environment for multiple nodes in accordance with embodiments of the present disclosure.

FIG. 3 illustrates a more detailed block diagram of an example system 300 configured for switches and devices in an environment for multiple nodes 202 in accordance with embodiments of the present disclosure. As shown in FIG. 3, the chassis 200 may include a management processor 348 communicatively coupled to one or more of chassis management controller 212 and switches 210. The management processor 348 may be any system, device, or apparatus configured to facilitate management and/or control of the switches 210. The management processor 348 may be configured to issue commands and/or other signals to the switches 210. The management processor 348 may comprise a microprocessor, microcontroller, DSP, ASIC, EEPROM, or any combination thereof. In one embodiment, the management processor 348 may run a Linux operating system and include application-programming-interfaces ("APIs") for supporting configuration of the system 300 for sharing devices connected to slots 220 of the chassis 200 to multiple nodes 202. The APIs of the management processor 348 may provide the interface to chassis management controller 212. Management processor 348 may be configured to manage both switches 210. In one embodiment, the management processor 348 may be communicatively coupled to a management fabric 340 and to the nodes 202. In another embodiment, the chassis management controller 212 may be communicatively coupled to the nodes 202 through the management fabric 340. The chassis management controller 212 may be directly communicatively coupled to the management fabric 340 or through, for example, the management processor 348.

Although FIG. 2 depicts the management controller 348 operable to facilitate management and/or control of the switches 210, in some embodiments of the present disclosure, one or more chassis management controllers 212 may be configured to perform the functionality of the management controller 348, in which a management controller 348 independent of the chassis management controllers 212 may not be present.

The chassis 200 may include multiple nodes 202. The chassis 200 may include any suitable number of nodes 202. In some embodiments, the nodes 202 may be referred to as "blades".

Each node 202 may include switch interfaces 204, as described in association with FIG. 2. Nodes 202 may include a basic input output system 346 ("BIOS") which may be implemented, for example, on firmware for execution by the information handling system. Each node 202 may access the BIOS 346 upon, for example, start-up of the node 202 to initialize interoperation with the rest of the chassis 200.

Node 202 may include a remote access controller 344. The remote access controller 344 may be implemented by, for example, a microprocessor, microcontroller, DSP, ASIC, EEPROM, or any combination thereof. The remote access controller 344 may be configured to communicate with one or more of the chassis management controllers 212 and the management processor 348. Such communication may be made, for example, through the management fabric 340. The remote access controller 344 may be configured to provide out-of-band management facilities for management of the node 202. Such management may be made by elements of the chassis 200 even if the node 202 is powered off or powered to a standby state. The remote access controller 344 may include a processor, memory, and network connection separate from the rest of the node 202. In certain embodiments, the remote access controller 344 may include or may be an integral part of a baseboard management controller (BMC), Dell Remote Access Controller (DRAC) or an Integrated Dell Remote Access Controller (iDRAC). The remote access controller 344 may be communicatively coupled to BIOS 346.

In one embodiment, each of nodes 202 may be communicatively coupled to each of switches 210 through one of the switch interfaces 304 resident on the node 202. Thus, each of the switches 210 may provide its switching fabric to each of the nodes 202 in order to route the given node 202 to respective slots 334 associated with the switch 210.

The slots 334 may be configured to couple to associated devices 236, though fewer devices may be present than the associated capacity of the chassis 200. The chassis 200 may include any suitable number of slots 334. In some embodiments, devices 336 may include PCIe-based cards or devices. Each such device 336 may represent an information handling resource to be selectively shared among multiple nodes 202 or dedicated to a single node 202. A device 336 may comprise, for example, a RAID controller, network card, or other information handling resource. Furthermore, a device 336 may include a specific shared component such as a NIC. Devices 336 may include management information or circuitry configured to provide information to the chassis 200 regarding the operation or specification of device 336, including but not limited to the components of the device and the firmware version of the device. For example, a device 336 may include EEPROM 338 containing such information.

In some embodiments of system 300, many of the devices 336 may be coupled to slots 334. In addition, such devices 336 may be shared among multiple nodes 202 or may be dedicated to a single node 202. When a device 336 is shared among multiple nodes 202, and such device 336 becomes degraded (e.g., fails or becomes overused beyond its capacity), such degradation can result in loss of functionality of one or more of the nodes 202 associated with the device 336, all the while a device 336 with the same functionality may be sitting idle or well under capacity in another slot 334. Thus, a mechanism for receiving event notification of devices 336 and nodes 202 may be desirable.

As shown in FIG. 3, system the chassis 200 may include internal switching fabrics (e.g., management fabric, Fabric A, Fabric B, etc.). In the embodiments represented by FIG. 3, Fabric A is associated with "Switch 1" and Fabric B is associated with "Switch 2". Although not depicted in FIG. 3, storage controllers 214 may each be associated with a particular switching fabric of the chassis 200 (e.g., based upon a slot or connectors via which a particular storage controller 214 is coupled to the mid-plane 206).

Because information handling resources, such as those in devices 336 coupled to slots 334, are not located within the node 202, but rather in a shared chassis using switches 210 to virtualize and route I/O communications among selected nodes 202, allocation of such event information may not be directly controlled by an associated node 202. As described in greater detail below, the chassis management controller 212 may be configured to send event notifications to devices that have subscribed to receive the event notifications. It is noted that while the functionality described herein contemplates virtualization for shared devices 336, the functionality described herein may also be extended to non-shared devices as well.

Figure 4:
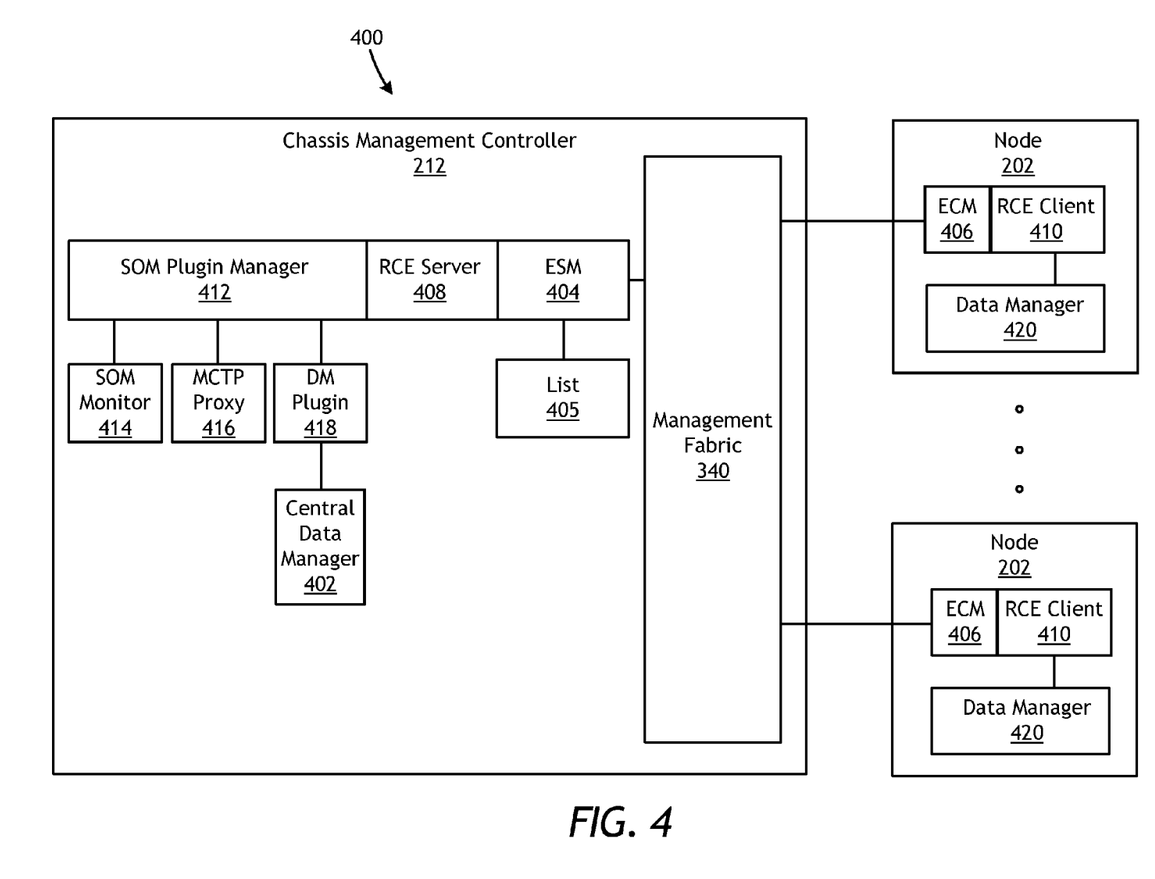
FIG. 4 illustrates another block diagram of an example system configured for switches and devices in an environment for multiple nodes in accordance with embodiments of the present disclosure.

FIG. 4 illustrates another block diagram of an example system 400 configured for switches and devices in an environment for multiple nodes 202 in accordance with embodiments of the present disclosure. The depicted embodiment illustrates only the chassis management controller 212 and nodes 202, however, other components and devices described above have been omitted for clarity. As described above, the system is configured for shared infrastructure event notification. The system 400, beneficially, allows for the notification of individual nodes of an event by managing a central data manager 402 located within the chassis management controller 212.

The central data manager 402, in one embodiment, receives notifications from individual nodes 202 and devices (see FIG. 3) whenever a node or device is added/removed/replaced. The chassis management controller 212 is configured to broadcast notifications in response to receiving an event notification from one of the nodes or devices.

In one embodiment, the chassis management controller 212 includes an event server module ("ESM") 404 that is configured for broadcasting events to nodes and/or devices that have previously subscribed to receive a notification. The ESM 404 may be, for example, an asynchronous messaging library capable of use in a distributed environment. The ESM 404 may provide sockets which enable many-to-many connections between nodes 202. The ESM 404 may be configured to operate in modes including, but not limited to, request-reply, publish-subscribe, push-pull, and exclusive pair.

In a further embodiment, the ESM 404 is configured to maintain a list 405, or lookup table, of subscriptions from event client modules ("ECM") 406 of the nodes 202. For example, each ECM 406 may request to receive notifications from every device connected to the management fabric 340. Alternatively, an ECM 406 may only request to receive notifications from devices with which the corresponding node 202 is communication. In other words, a node 202 may only be concerned with a particular disk drive, and therefore the ECM 406 only subscribes to notifications related to that particular disk drive.

Additionally, the ESM 404 may maintain, in the list 405, a current inventory of available components within the shared infrastructure environment. In other embodiments, the current inventory of available components may be maintained within the central data manager 402 by the ESM 404, or by a server object manager 412. Beneficially, this current inventory of available components may be made available to nodes 202 or other devices seeking to determine the information processing capability of the shared infrastructure environment.

The chassis management controller 212, in one embodiment, includes a remote command execution ("RCE") server 408. The RCE server 408 is similar in functionality to the remote access controller 344 described above with reference to FIG. 3. The RCE client 410 communicates with the RCE server 408 via the management fabric 340. The ECM 406 and ESM 404 may be integrated as part of the RCE client 410 and RCE Server 408, respectively. In one embodiment, the RCE server 408 is configured to translate and route commands to central data manager 402 via a removable server object manager ("SOM") plugin manager 412. The SOM plugin manager 412 is configured to communicate with a SOM monitor 414, a management component transport protocol ("MCTP") proxy 416, and a data manager ("DM") plugin 418.

In one embodiment, the SOM monitor 414 is configured for interfaces to monitor the server objects, or information handling devices. The server objects, as described above, may include shared or non-shared information handling devices including but not limited to, storage devices. The SOM monitor 414 may monitor, for example, the physical conditions (e.g., temperature, etc.) of the information handling devices. The MCTP proxy 416, in one embodiment is a proxy to other devices that may not be compatible with the SOM monitor 414. For example, the MCTP proxy 416 may be configured to translate a protocol that the SOM plugin manager 412 understands to a protocol the other device understands.

In one embodiment, the DM plugin 418 is configured to maintain information in the central data manager 402. The information, for example, relates to the physical status (e.g., capability, firmware version, etc.) and/or the health of the information handling devices. In a similar manner, each node 202 includes a data manager 420 for maintaining relevant device information. The data manager 420 is configured to maintain a local copy of device information related to devices coupled with, or otherwise in communication with, the node 202. The RCE client 404 is configured to communicate the information with the RCE server 408 so that the information may be stored in the central data manager 402. As described above, the ESM 404 may be configured to intercept the information and determine if a notification should be broadcast to ECMs 406 that have subscribed for event updates.

Beneficially, the system 400 is configured to sending and receiving event notifications via the management fabric 340. As described above, the management fabric 340 is an "out-of-band" communication bus that enables sending and receiving event notifications even when a node 202 is powered off. In other words, the ESM 404 and ECM 406 are configured to operate at a firmware level of the system 400.

The present disclosure is described hereinafter with reference to flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart and/or block diagram block or blocks.

Figure 5:
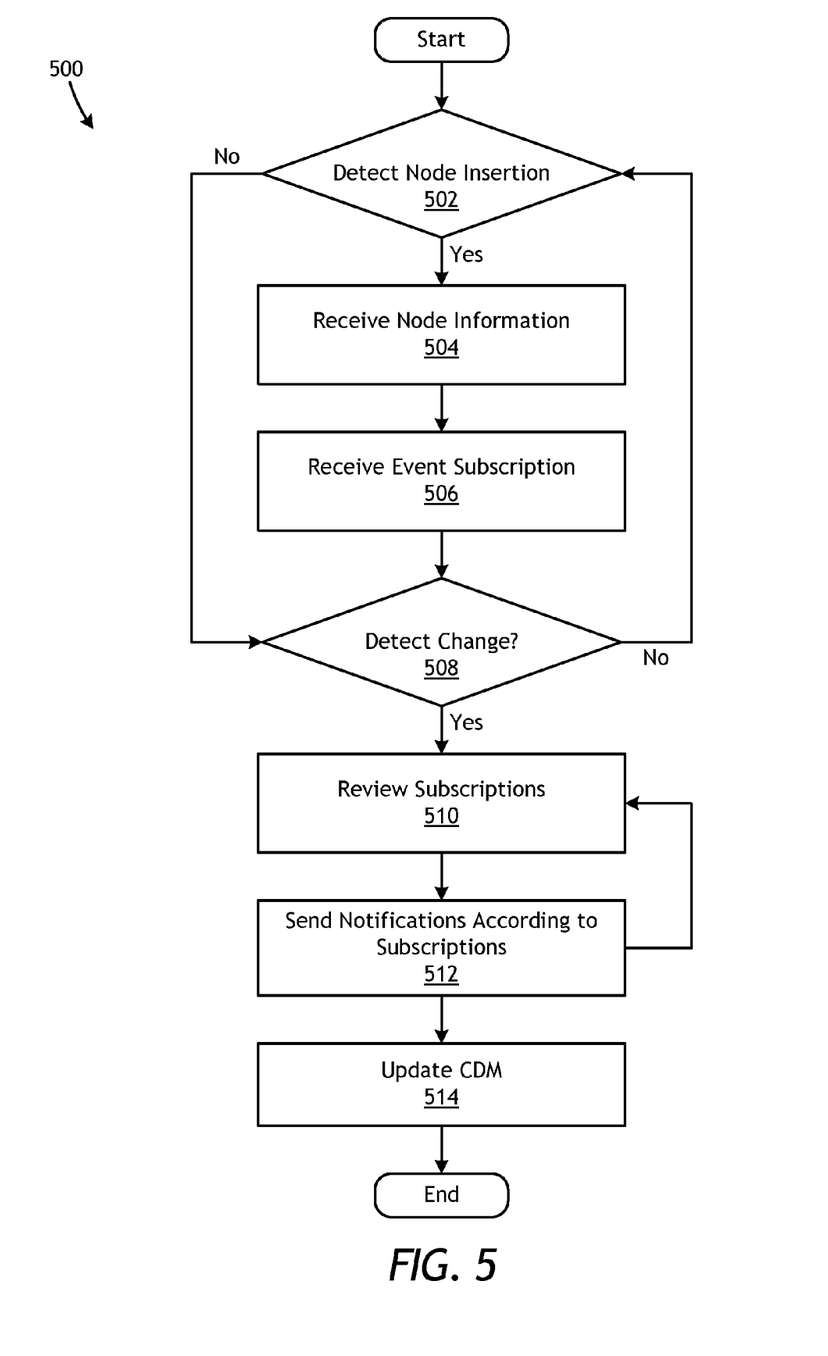
FIG. 5 illustrates a flow diagram of one embodiment of a method for sharing event notifications in a shared infrastructure environment.

FIG. 5 illustrates a flow diagram of one embodiment of a method 500 for sharing event notifications in a shared infrastructure environment. The method is performed by processing logic that may comprise hardware (circuitry, dedicated logic, etc.), software (such as is run on a general purpose computer system or a dedicated machine), or a combination of both. In one embodiment, the method is performed by an event server module (e.g., ESM 404 of FIG. 4).

The method 500 begins and the processing logic, at block 502, detects whether a node has been inserted. In another embodiment, the processing logic is configured to determine whether an operating state of the node has been modified (i.e., powered down). If the processing logic 502 has not detected a new inserted node, the processing logic continues to block 508 and monitors for other hardware changes.

If, at block 502, the processing logic detected a node insertion, the processing logic receives node information, at block 504. Examples of node information include, but are not limited to, a processing capability of the node, a component inventory of the node, and firmware versions of the components of the node. At block 506, the processing logic then receives event subscription information and stores the subscription in a list, lookup table, database, etc. The subscription may indicate a desire for a node to receive all event updates broadcasted by the processing logic, or alternatively, the subscription may indicate a desire to only receive specific event updates.

At block 508, the processing logic monitors, via the management fabric, for notifications from devices or nodes. If the processing logic detects a change or update, the processing logic, at block 510, reviews the subscriptions stored in the list. One non-limiting example of an update includes the presence of a new network interface card or storage device. The processing logic then, at block 512, sends notifications according to the subscriptions, and updates the central data manager at block 514. If no change is detected, at block 508, the processing logic continues to monitor/detect, or alternatively, the method 500 may end.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

We claim:

1. A method performed on a computing device having a processor and memory, the method comprising:
    receiving, via a management fabric and at an event server module executing on the computing device, a subscription from at least one of a plurality of event client modules, where each of the plurality of event client modules corresponds to one of a plurality of nodes, where the subscription is associated with a hardware component, and where the management fabric comprises an out-of-band communication channel communicated over a second network interface separate from an in-band communication channel communicated over a first network interface;
    receiving, via the management fabric and at the event server module, a hardware component update from at least one of the plurality of event client modules, where the hardware component update is associated with the hardware component;
    identifying event client modules of the plurality of event client modules that have subscribed to receive hardware component updates associated with the hardware component;
    sending the hardware component update, via the management fabric, to the identified event client modules through the out-of-band communication channel; and
    receiving node information from each of the plurality of event client modules, wherein the node information comprises a firmware version for each hardware component attached to a corresponding node of the plurality of nodes, and wherein at least one of the steps of receiving a hardware component update and sending the hardware component update is performed while the node corresponding to the event client module receiving or sending the hardware component update is in a powered down or standby state.

2. The method of claim 1, further comprising maintaining a list of subscriptions from the plurality of nodes.

3. The method of claim 1, further comprising updating a central data manager with the hardware component update.

4. The method of claim 1, further comprising monitoring a plurality of hardware components for a change in operating mode, where the change in operating mode comprises at least one of a firmware update, a power status update, or a service degradation update, and where the hardware component update comprises information detailing the change in operating mode.

5. The method of claim 1, where the event server module is an asynchronous messaging server configured for many-to-many connections with the plurality of event client modules.

6. At least one computer storage device storing computer-executable instructions that, when executed by a computing device that includes a processor and a memory, cause the computing device to perform actions comprising:
    receiving, via a management fabric and at an event server module executing on the computing device, a subscription from at least one of a plurality of event client modules, where each of the plurality of event client modules corresponds to one of a plurality of nodes, and where the subscription is associated with a hardware component, where the management fabric comprises an out-of-band communication channel communicated over a second network interface separate from an in-band communication channel communicated over a first network interface;
    receiving, via the management fabric and at the event server module, a hardware component update from at least one of the plurality of event client modules, where the hardware component update is associated with the hardware component;
    identifying event client modules of the plurality of event client modules that have subscribed to receive hardware component updates associated with the hardware component;
    sending the hardware component update, via the management fabric, to the identified event client modules through the out-of-band communication channel; and
    receiving node information from each of the plurality of event client modules, wherein the node information comprises a firmware version for each hardware component attached to a corresponding node of the plurality of nodes, and wherein at least one of the steps of receiving a hardware component update and sending the hardware component update is performed while the node corresponding to the event client module receiving or sending the hardware component update is in a powered down or standby state.

7. The at least one computer storage device of claim 6, the actions further comprising maintaining a list of subscriptions from the plurality of nodes.

8. The at least one computer storage device of claim 6, the actions further comprising updating a central data manager with the hardware component update.

9. The at least one computer storage device of claim 6, the actions further comprising monitoring a plurality of hardware components for a change in operating mode, where the change in operating mode comprises at least one of a firmware update, a power status update, or a service degradation update, and where the hardware component update comprises information detailing the change in operating mode.

10. The at least one computer storage device of claim 6, where the event server module is an asynchronous messaging server configured for many-to-many connections with the plurality of event client modules.

11. A system comprising at least one computing device and at least one software module that are together configured for performing actions, where the computing device includes a processor, a first network interface, a second network interface, and a memory, the actions comprising:
    receiving, via a management fabric and at an event server module executing on the computing device, a subscription from at least one of a plurality of event client modules, where each of the plurality of event client modules corresponds to one of a plurality of nodes, where the subscription is associated with a hardware component, and where the management fabric comprises an out-of-band communication channel communicated over the second network interface separate from an in-band communication channel communicated over the first network interface;

receiving, via the management fabric and at the event server module, a hardware component update from at least one of the plurality of event client modules, where the hardware component update is associated with the hardware component;

identifying event client modules of the plurality of event client modules that have subscribed to receive hardware component updates associated with the hardware component;

sending the hardware component update, via the management fabric, to the identified event client modules through the out-of-band communication channel; and receiving node information from each of the plurality of event client modules, wherein the node information comprises a firmware version for each hardware component attached to a corresponding node of the plurality of nodes, and wherein at least one of the steps of receiving a hardware component update and sending the hardware component update is performed while the node corresponding to the event client module receiving or sending the hardware component update is in a powered down or standby state.

12. The system of claim 11, the actions further comprising maintaining a list of subscriptions from the plurality of nodes.

13. The system of claim 11, the actions further comprising updating a central data manager with the hardware component update.

14. The system of claim 11, the actions further comprising monitoring a plurality of hardware components for a change in operating mode, where the change in operating mode comprises at least one of a firmware update, a power status update, or a service degradation update.

* * * * *